US007308465B2

(12) United States Patent
Miller

(10) Patent No.: US 7,308,465 B2
(45) Date of Patent: Dec. 11, 2007

(54) PLAYBACK GRAPH FOR DATA SYNCHRONIZATION

(75) Inventor: Michaeljon Miller, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 657 days.

(21) Appl. No.: 10/406,529

(22) Filed: Apr. 3, 2003

(65) Prior Publication Data

US 2004/0199548 A1 Oct. 7, 2004

(51) Int. Cl.
*G06F 17/30* (2006.01)
(52) U.S. Cl. ............... 707/201; 707/203; 707/204; 707/10; 715/501.1
(58) Field of Classification Search .......... 707/200, 707/202, 201, 203, 204, 10; 715/501.1
See application file for complete search history.

(56) References Cited

U.S. PATENT DOCUMENTS

| 5,491,820 | A  | * | 2/1996  | Belove et al. ............. 707/3 |
| 5,926,816 | A  | * | 7/1999  | Bauer et al. ............. 707/8 |
| 6,192,365 | B1 | * | 2/2001  | Draper et al. ............. 707/101 |
| 6,226,650 | B1 | * | 5/2001  | Mahajan et al. ........... 707/201 |
| 6,799,190 | B1 | * | 9/2004  | Boothby .................. 707/204 |
| 6,820,088 | B1 | * | 11/2004 | Hind et al. ............... 707/101 |
| 6,910,052 | B2 | * | 6/2005  | Gates et al. .............. 707/201 |
| 7,024,429 | B2 | * | 4/2006  | Ngo et al. ................ 707/201 |
| 7,216,289 | B2 | * | 5/2007  | Kagle et al. .............. 715/501.1 |
| 2003/0145020 | A1 | * | 7/2003 | Ngo et al. ................ 707/201 |

FOREIGN PATENT DOCUMENTS

| WO | WO 97/04391 | 2/1997 |
| WO | WO 00/65458 | 11/2000 |

OTHER PUBLICATIONS

Agent-oriented Model for Managing Long-lived Transaction, Based on Work-flow and Task graph□□Toyohide Watanabe□□Sep. 23-26, 1999□□.*
European Search Report.
"Eliminate Unnecessary Logging of Database Manager Index Manager Transactions," IBM Technical Disclosure Bulletin, vol. 36, No. 1, Jan. 1993, pp. 397-400.1,
Copy of Examination Report

* cited by examiner

*Primary Examiner*—Tim Vo
*Assistant Examiner*—Mahesh Dwivedi
(74) *Attorney, Agent, or Firm*—Westman, Champlin & Kelly, P.A.

(57) ABSTRACT

Embodiments of the present invention pertain to a data structure designed to manage object relationships to actual transactions. The data structure is at least an efficient substitute for a simple ordered transaction log. The data structure allows for pre-playback graph pruning that reduces the overall time required to complete a playback operation. It also allows for more robust error handling when a given transaction fails for non-transport related errors (i.e., the business rules or security rights have changed) by keeping the graph updated on a per-object basis.

34 Claims, 6 Drawing Sheets

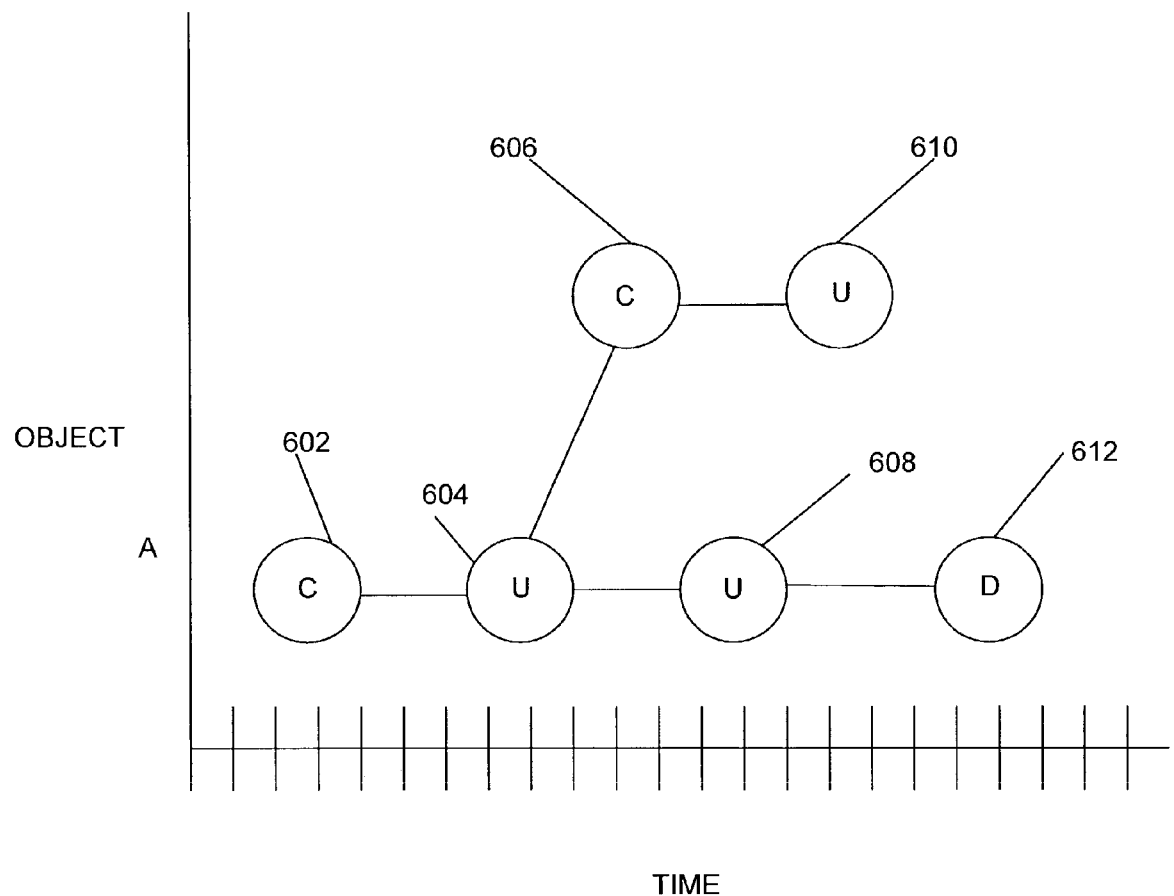

PLAYBACK GRAPH FOR DATA SYNCHRONIZATION

BACKGROUND OF THE INVENTION

The present invention relates to data synchronization of a client device that has been disconnected from its associated server. More specifically, the present invention pertains to a data structure designed to facilitate efficient transaction playback from a client to a server.

Applications running in disconnected states have a requirement to keep their data in sync with some central data store. This requirement, at its most basic level, can be met by using existing data replication technologies (such as SQL Server data replication). However, pure replication may create a security hole when moving local data to the central store. This security hole has at least two parts. First, data can be modified in the local client without regard to security business rules (i.e., a user could open the raw table data using any number of data editing tools and change information to which they may not necessarily have access). Second, business rules change frequently and may change while the user has been disconnected from the central store (and central business rule repository).

One way to overcome disadvantages associated with data replication is to construct and play back a transaction log. A transaction log is a recorded list of operations performed on a disconnected client application. During playback, when the client is re-connected to a server and its associated business rules and central data store, the recorded operations are applied utilizing the server business rules to manipulate data stored in the central store (i.e., modify data, delete data or create new data).

Playing back a complete list of transactions can be very time and bandwidth consuming. For example, update of a central data store can take a particularly long time for a person on a low bandwidth connection playing back a large number of transactions. In some instances, the transactions themselves can be relatively large in size. Another problem associated with designs that rely on complete transaction playback is that they are not particularly robust with respect to low-quality connections or where a user has canceled a playback.

SUMMARY OF THE INVENTION

Embodiments of the present invention pertain to a data structure designed to manage object relationships to actual transactions. The data structure is at least an efficient substitute for a simple ordered transaction log. The data structure allows for pre-playback graph pruning that reduces the overall time required to complete a playback operation. It also allows for more robust error handling when a given transaction fails for non-transport related errors (i.e., the business rules or security rights have changed) by keeping the graph updated on a per-object basis.

BRIEF DESCRIPTION OF THE DRAWINGS

FIG. 6 is a diagrammatic representation of a more complex playback graph.

DETAILED DESCRIPTION OF THE ILLUSTRATIVE EMBODIMENTS

I. Exemplary Operating Environments

Figure 1:
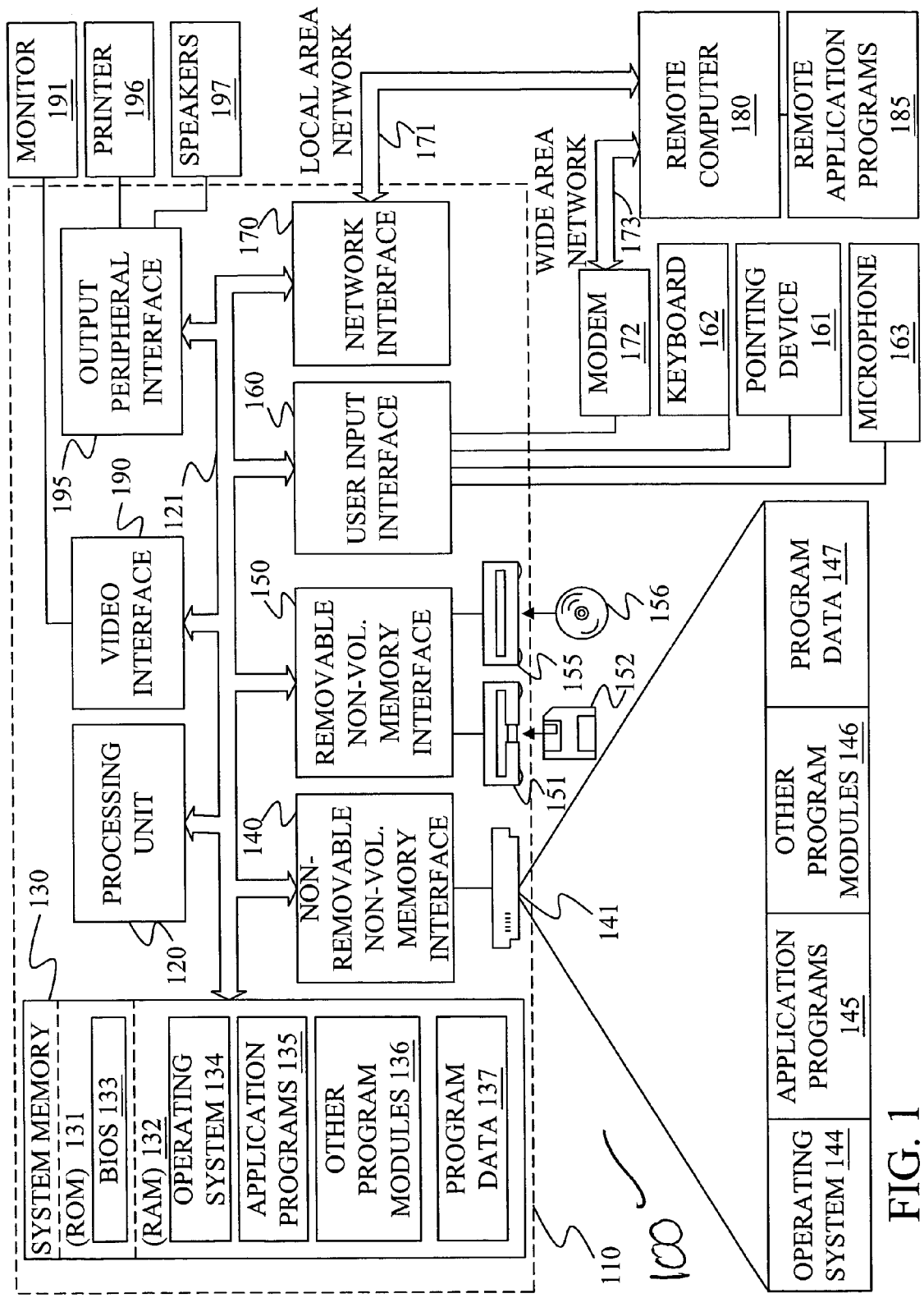
FIG. 1 is a block diagram of a general computing environment in which the present invention may be practiced.

FIG. 1 illustrates an example of a suitable computing system environment 100 within which embodiments of the present invention may be implemented. The computer system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the description and figures as processor executable instructions, which can be written on any form of a computer readable media.

With reference to FIG. 1, and exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read-only media (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136 and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 in a wide area network (WAN) 173, but may also include other networks. Such networking environments are commonplace in offices, enterprise-wide networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communication over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on the remote computer 180. It will be appreciated that the network connections shown are exemplary and other means of establishing a communications link between the computers may be used.

II. System Overview

Figure 2:
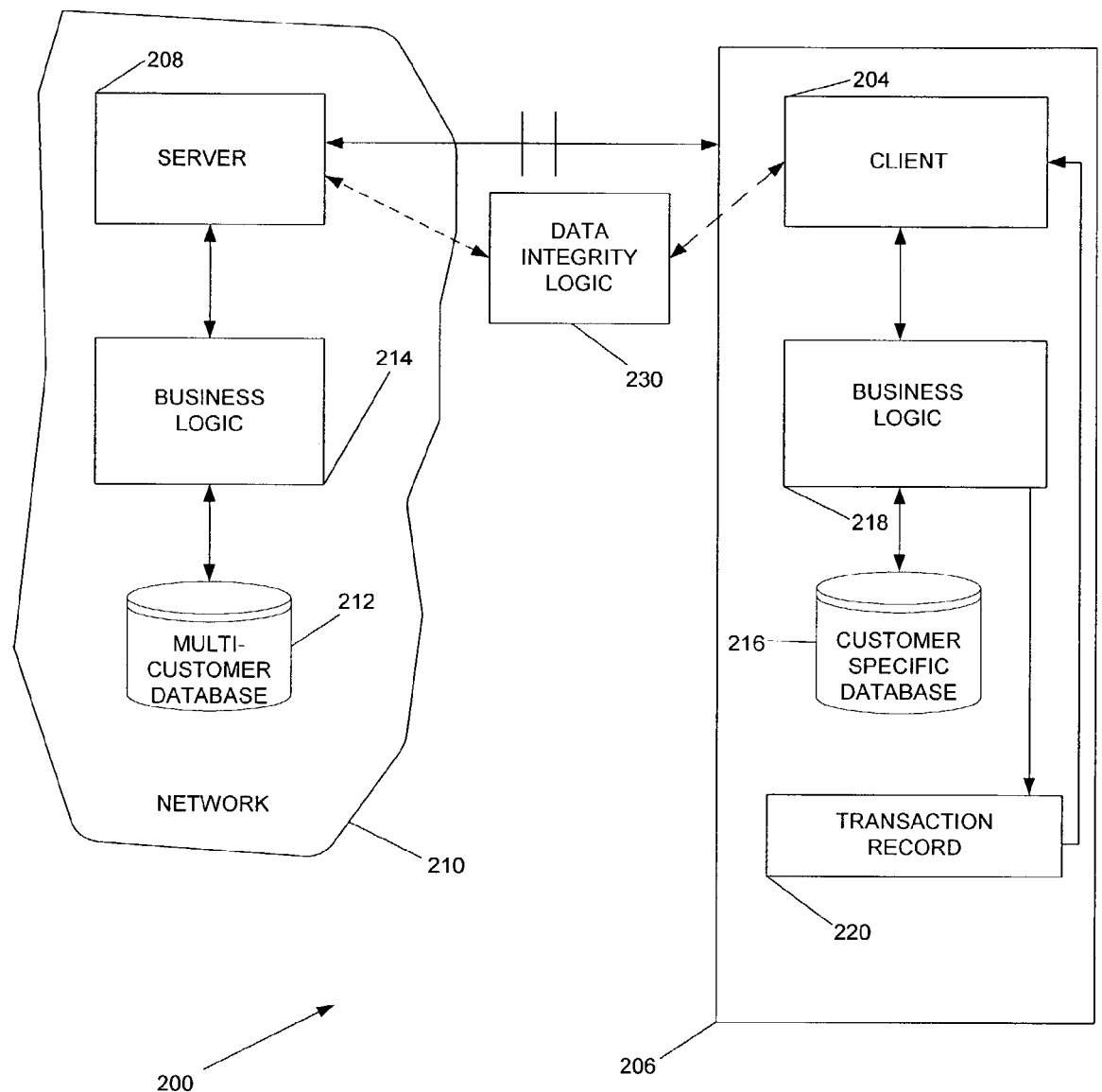
FIG. 2 is a schematic block diagram of a customer relationship management system.

FIG. 2 is a schematic block diagram of a customer relationship management (CRM) system 200 that incorporates certain aspects of the present invention. It should be noted that embodiments of the present invention are applicable within contexts other than CRM systems. A CRM system is presently provided as one specific example to facilitate description of embodiments of the present invention. The scope of the present invention is not so limited.

System 200 includes a client 204 implemented on a device 206. Client 204 is illustratively configured to connect, at least temporarily, to a server 208 that is maintained on a network 210. Examples of devices that may be suitable for application as device 206 include, but are not limited to, a personal computer, a hand-held or laptop computer, a cell phone or a network PC.

Server 208 is configured to at least responsively retrieve, store, and otherwise manipulate information in association with database 212 (i.e., modify data, delete data or create new data), which is illustratively a database containing data that is associated with a plurality of customers. Business logic 214 is illustratively a organization system for the management of database 212. Business logic 214 illustratively includes relationships, definitions, rules, access parameters, and/or other tools for the management of database 212. In accordance with one embodiment, business logic 214 is a data structure system that enables interrelated data objects (i.e., customer objects, product objects, sales objects, etc.) having customized data fields or attributes.

Client 204 is configured to retrieve, store, and otherwise manipulate information in association with database 216 (i.e., modify data, delete data or create new data), which is illustratively a database containing data that is associated with a limited set of customers (i.e., customer data that is extracted from database 212 and related specifically to customers associated with a particular user of device 206). Business logic 218 is illustratively a organization system for the management of database 216. Business logic 218 illustratively includes relationships, definitions, rules, access parameters, and/or other tools for the management of database 216. In accordance with one embodiment, business logic 218 is a data structure system that enables interrelated data objects (i.e., customer objects, product objects, sales objects, etc.) having customized data fields or attributes. In accordance with another embodiment, business logic 218 and business logic 214 are configured to operate in coordination with one another to provide an operator with a substantially continuous experience regardless of which of the two logic systems is being utilized.

Client 204 can illustratively be used in an online mode, wherein a connection to server 208 is maintained, and an offline mode, wherein client 204 is disconnected from server 208. System 200 is illustratively configured to provide a disconnected user experience for operators of device 206 that are not able to maintain a connection between client 204 and server 208. For example, an operator of device 206 may be a sales person who desires access to access customer data in remote locations where a connection to server 208 is not convenient.

Data integrity logic 230 operates to manage and protect data that is transferred between server 208 and client 204. While data integrity logic is illustrated between device 206 and network 210, portions or all of logic 230 may actually be implemented on either of network 210 or device 206. For example, portions or all of data integrity logic 230 can be implemented as part of business logic 214 and/or business logic 218. The present invention is not limited to any specific implementation of data integrity logic 230.

Figure 3:
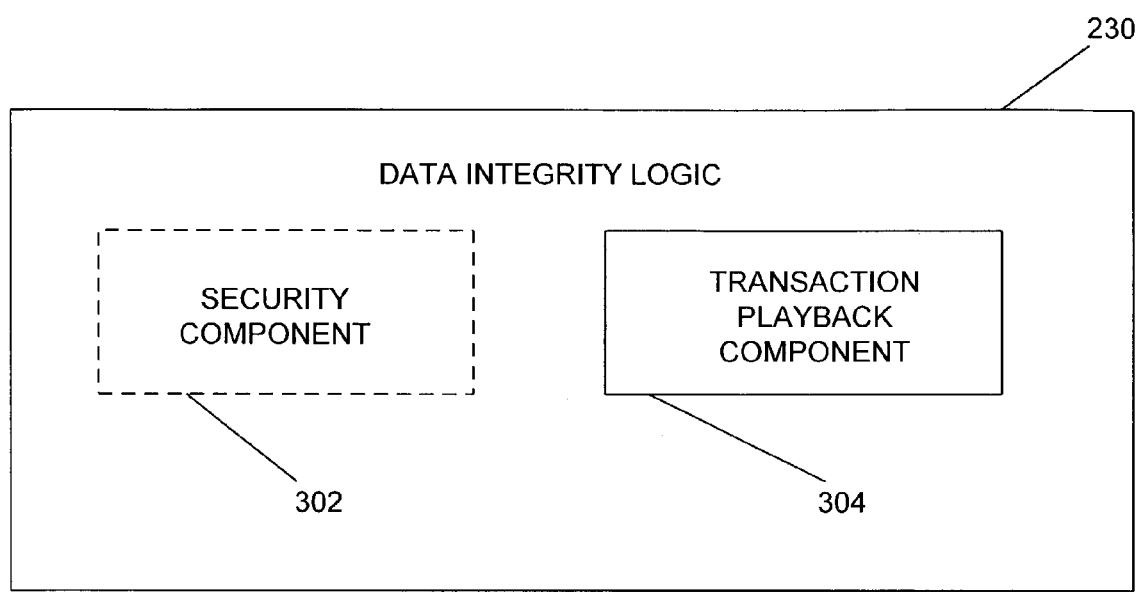
FIG. 3 is a block representation of a data integrity logic component.

FIG. 3 is a block representation of data integrity logic 230. Data integrity logic 230 includes a security component 302 and a transaction playback component 304. Security component 302 is an optional element and is configured to provide data security. For example, in accordance with one embodiment, security component 302 is configured to limit the data transferred from database 212 to database 216 to data specifically associated with a particular operator of device 206. For example, a sales person associated with device 206 may only be able to retrieve data associated with his or her clients.

Transaction playback component 304 is illustratively configured to support transfers of data between client 204 and server 208. For example, after data has been transferred from database 212 to database 216, and after that data in database 216 has been modified during a period of time when client 204 is disconnected from server 208, transaction playback component 304 is configured to facilitate the updating of database 212 when client 204 is re-connected to server 208.

As will be described below, a data-directing component manages when business logic 214 to be is utilized, and when business logic 218 is to be utilized, relative to changes in the connected/disconnected state of client 204 and server 208. The data-directing component also manages when a transaction record 220 is updated relative to changes in the connected/disconnected state. In accordance with one embodiment, the data-directing component is implemented as part of transaction playback component 304. However, without departing from the scope of the present invention, the data-directing component can be otherwise implemented. For example, portions or all of the data-directing component can be implemented as part of business logic 218.

In the online mode, client 204 illustratively runs on device 206 and processes basic application logic locally. However, the primary business logic processing happens on server 208 (i.e., in association with business logic 214). Client 204 is utilized to manipulate data contained within database 212 (i.e., modify data, delete data or create new data).

In accordance with one embodiment of the present invention, transition between the online and offline modes is basically or completely transparent to client 204 and client 204 code. The data-directing component, which can be implemented as part of business logic 218, data integrity logic 230, or otherwise implemented, is utilized to control message routing. When server 204 is in the online mode, the data-directing component facilitates communication between client 204 and server 208 utilizing a network communications protocol, such as TCP/IP.

In the offline mode, client 204 continues to implement basic application logic locally on device 206. However, once offline, the data-directing component changes the communication transport from the network protocol (i.e., TCP/IP) to named pipes. In the offline mode, the data-directing component sends requests to business logic 218 for processing. Also, the data-directing component stores all "write" requests to a database 220 that is local relative to client 204. Database 220 is illustratively a "playback queue" utilized to update data associated with server 208 (i.e., data in database 212) after client 204 is returned to the online configuration. One aspect of the present invention, which will be discussed in detail in relation to other Figures, pertains to a particular architecture and design for the playback queue associated with database 220.

Transition between online and offline modes is illustratively controlled exclusively by an operator of device 206. There is no automatic transition between modes as this might cause confusion for the operator (i.e., essentially leading to the operator asking the question "am I online or offline?"). Moving from online to offline can illustratively happen in at least two ways—the first is when the operator of device 206 chooses to disconnect client 204 from server 208; the second is when the operator chooses to update database 216 prior to actually disconnecting. In the latter case, client 204 makes a request to server 208 asking for the construction of an "offline data set." In accordance with one embodiment, a series of constructed views are utilized to enable a SQL Server to perform standard merge replication to client 204. Data that is being copied to database 216 from database 212 need not be processed through business logic 214, nor through security checks, because that data was already processed when it was originally entered into server 208.

III. The Playback

When client 204 is operating in the offline mode, the data-directing component makes one additional database write for all successful data modification actions against database 216. In accordance with one aspect of the present invention, the additional write occurs against a specialized transaction record 220, namely, a playback graph. The playback graph is an object update graph that tracks all modifications (update, create, and delete operations) against any given object. However, the playback graph is not a completely serial recording, like a strict transaction log, of all action against the local store while offline. In accordance with one embodiment the play back graph is derived from a strict transaction log that is independently maintained.

Following a period of offline activity, when an operator of device 206 chooses to reconnect to server 208, business logic 218 and other local operational components are bypassed by the data-directing component, and a synchronization process is started. The synchronization process for reconnecting to server 208 is somewhat more involved than the process for disconnecting from the server. For example, simple data replication and transfer (i.e., SQL replication) isn't utilized because it is preferable that there be some guarantee that all up-to-date business logic is performed on any data submitted to server 208. For example, while an operator of device 206 has client 204 disconnected from server 208, their security privileges may be altered, or objects to which they originally had access may have been modified in such a way as to render that access obsolete. For this reason, transactions should be played back through business logic 214.

A separate, though related, reason to play back transactions through business logic 214 is to guarantee that all objects work within current workflow and callout process rules. Certain integration with third party application is implemented utilizing a callout mechanism. Because integration isn't possible for an offline user, corresponding business logic must be triggered for those actions the user performed while offline. Utilization of a playback process essentially guarantees that the necessary processing occurs.

Figure 4:
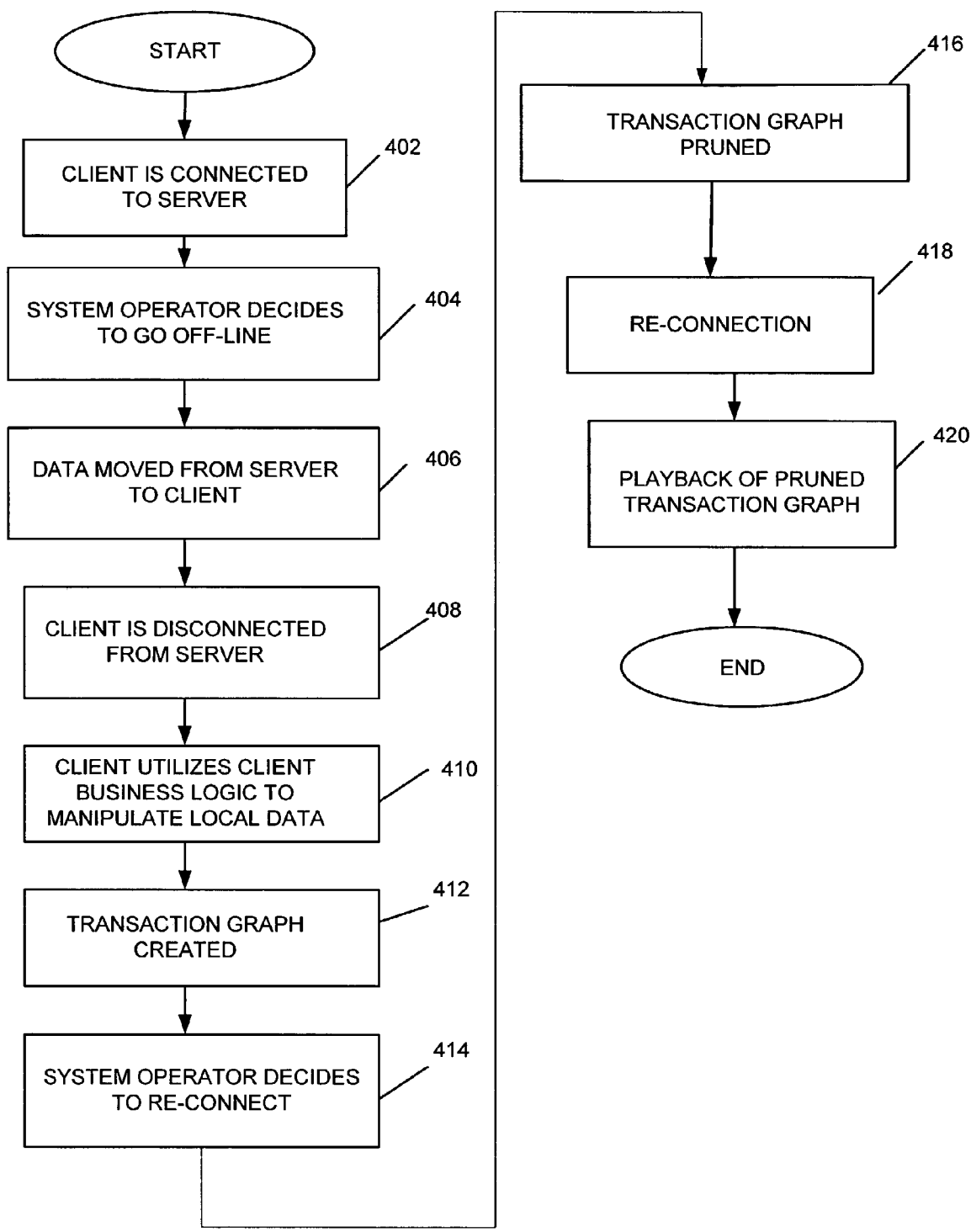
FIG. 4 is a schematic flow diagram that illustrates steps associated with connection and re-connection of a client to a server.

FIG. 4 is an example schematic flow diagram that illustrates steps associated with connection and re-connection of client 204 to server 208. In accordance with block 402, the process begins with client 204 in connection with server 208. In this state, client 204 works through server 208 to utilize business logic 214 to manipulate data within database 212 (i.e., modify data, delete data or create new data). Next, as is indicated by block 404, an operator of device 206 decides to disconnect from server 208. After the decision to go offline has been made, a limited set of data is illustratively replicated from database 212 and transferred to database 216 (block 406). Then, in accordance with block 408, client 204 is disconnected from server 208 (i.e., at the system operator's initiative).

Following disconnection, as is indicated by block 410, client 204 utilizes business logic 218 to manipulate data stored within database 216 (i.e., modify data, delete data or create new data). In accordance with block 412, a transaction graph is created to track modifications of data performed by server 204 on database 216. Next, as is indicated by block 414, an operator of device 206 decides to re-connect to server 208. In accordance with block 416, the transaction graph is pruned. Generally speaking, the precise timing of when the graph is pruned is not critical to the present invention. The pruning occurs prior to or during transmission from client 204 to server 208. Block 418 indicates re-connection of client 204 to server 208. Finally, block 420 indicates replay of data modification functions or operations derived from the pruned transaction graph through business logic 214 for direct modification of the corresponding data contained in database 212. Following playback, the process can be repeated.

IV. The Playback Graph

As was mentioned above, in association with offline behavior, offline transactions are recorded to a playback graph that operates as at least a portion of transaction record 220. Playback graph 220 illustratively does not record and play back transactions serially. Instead, playback graph 220 captures and manipulates interactions in such a way that playback to server 208 is highly optimized. In accordance with one aspect of the present invention, transactions that do not need to be played back are eliminated from playback graph 220. Accordingly, playing back transactions in association with playback graph 220 is more efficient than playing back transactions serially.

Playback graph 220 illustratively includes an object-specific record of offline data modifications. During playback, it is not generally necessary to play back each object's entire life cycle. In accordance with one aspect of the present invention, the sequence of events representing an object's life cycle can be examined in order to identify events that can be collapsed or deleted. For example, an examination of an object's life cycle will reveal unnecessarily repetitive transactions and/or transactions that an operator of device 206 may have desired at one time and later decided against (e.g., an object is changed then subsequently changed back to its original state).

In accordance with one aspect of the present invention, the playback graph provides transactional history of various objects. For each object, the transactional history is collapsed through the deletion of unnecessary or repetitive transactions. Transactions corresponding to the collapsed graph are played back from the client to the server for modification of data on the server side. Generally speaking, the goal is to eliminate unnecessary transactions and generate an optimized (e.g., minimized) list of transactions for playback.

Figure 5:
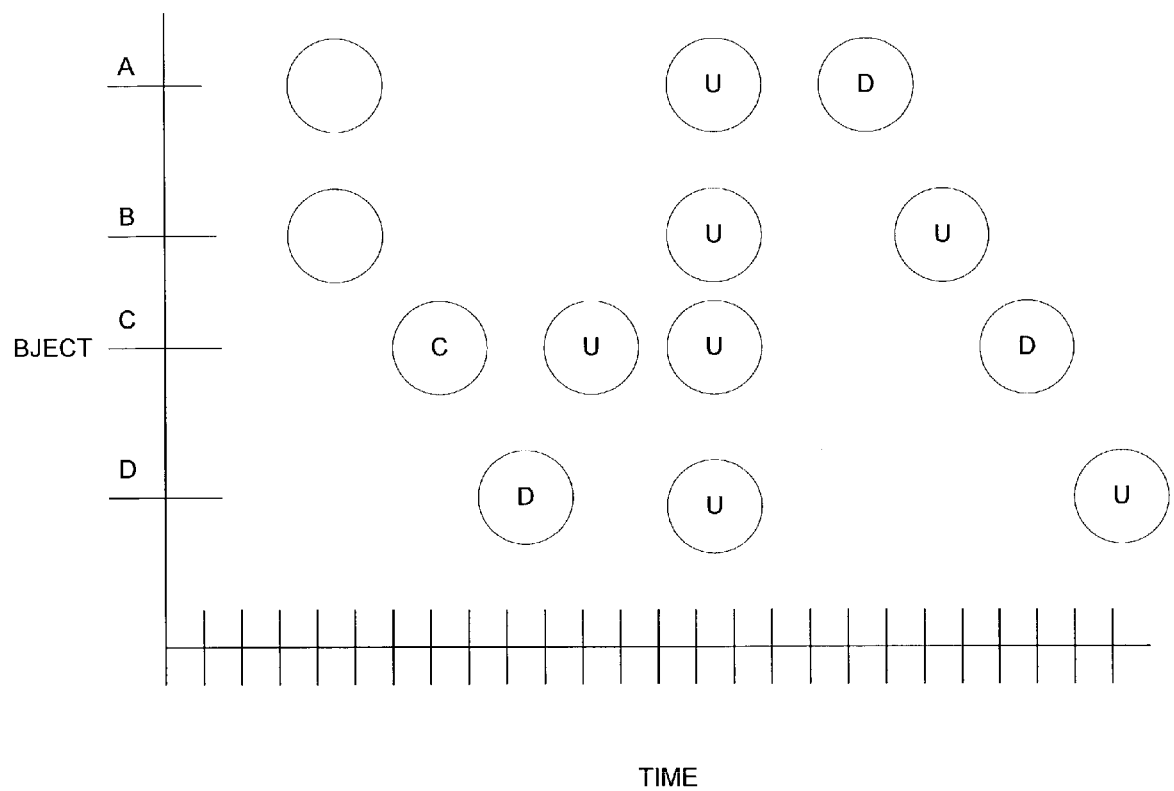
FIG. 5 is a diagrammatic representation of a playback graph.

FIG. 5 is a diagrammatic representation of a playback graph. The graph plots data modifications for four objects (A-D) over a period of time.

Nodes containing a "U" indicate an update operation against an object. For example, an update operation occurs when a system operator changes a field or attribute associated with an object. Nodes labeled "D" represent delete operations performed against an object. For example, a delete operation occurs when a system operator deletes an object. The "C" nodes represent instances when a system operator creates a new object. The unlabeled nodes are existing objects at time zero. For example, when time zero is the instance when a client went offline, the unlabeled nodes represent objects that existed prior to the disconnection from the server.

In accordance with one aspect of the present invention, prior to transmission from client 204 to server 208, certain transactions are pruned from the playback graph. For example, with reference to the sample playback graph provided in FIG. 5, the thirteen operations that occur across the timeline can be consolidated into just four transactions. Only these four operations need be "played back" to the central server (i.e., server 208). An explanation as to how the FIG. 5 playback graph is collapsed from 13 to four transactions will now be provided.

The object identified as "C" can be completely removed from the playback graph because its entire lifetime was in an offline state, and it was deleted before re-connection to the central server. Several update actions occurred simultaneously (perhaps as the result of an assign or share operation). The simultaneous update actions can all be compressed out of the graph owing to subsequent update or delete operations. Object "D" has two surviving actions in the graph, namely, a create action and a subsequent update action. As will be described below, it is even possible to combine these two into a single create action. Object "A" has one surviving action in the graph, namely, a delete action. Because object "A" existed before time zero, the delete action must be carried back to the original creation of the object for execution. Object "B" has one surviving action in the graph, namely, an update action. The two update actions for object "B" are consolidated into one update action. The four surviving operations are the basis for playback in lieu of the original thirteen operations. In accordance with one embodiment, the four surviving operations are turned into actual API calls (Application Program Interface calls) and sent to the central server (e.g., server 208) for execution in accordance with server-side business rules (214).

In accordance with one embodiment, a playback graph is constructed contemporaneously as offline operations are locally performed on client 204 and recorded in database 220 (i.e., recorded in a transaction log). Collapsing or pruning of the playback graph can be accomplished before or during the playback process. It can also be carried out during construction of the playback graph. The precise timing is not critical to the present invention.

The playback graph provided in FIG. 5 is a relatively simple example in that the illustrated objects bear no apparent relationship to one another. FIG. 6 is a diagrammatic representation of a more complex playback graph. The graph plots data manipulations for an object "A" over a period of time. An exemplary collapse or pruning of the FIG. 6 graph will now be explained in detail.

As is illustrated by node 602, object "A" was created during an offline period. It is assumed that the creation action indicated by node 602 occurred after time zero (i.e., the time when the client went offline from the server). As is indicated by node 604, object "A" was subsequently updated. As is indicated by node 606, a new object was created and "attached" to the update node 604. In accordance with nodes 608 and 610, updating was performed with regard to both of the created objects.

In accordance with one aspect of the present invention, the association between the create node 606 and the update node 604 can be dependent or freestanding. A dependent association means that node 606 is "tied to" node 604, and that the fate of node 606 is dependent upon the fate of node 604. A freestanding association means that the fate of node 606 is not dependent upon the fate of node 604. The nature of the association between two related nodes is illustratively indicated in one or both of the nodes, or is otherwise indicated.

Node 612 is a delete node. In order to determine which nodes should be deleted in accordance with node 612, one can imagine hoisting node 108 into the air such that related nodes dangle there from (i.e., the line between nodes are thought of as connecting strings). Generally speaking, the dangling nodes can be deleted. Nodes 602, 604 and 608, which were created offline, can be deleted in accordance with node 612.

The fate of nodes 606 and 610, however, depends on the nature of association between nodes 604 and 606. If the association is dependent in nature, then the create node 606 was parented from an update object that is to be deleted, so the whole branch of the associated node (nodes 606 and 610) can be deleted. If the association is freestanding, then the node 606 branch should not be deleted. Instead, nodes 604 and 606 should be disassociated from one another. In accordance with one embodiment, once disassociated, the branch corresponding to node 606 can is left on its own. Alternatively, however, node 606 can be re-associated with a different parent node.

For the purpose of illustration, it will be assumed that the object created in accordance with node 602 is an account object, an account object being an account associated with a particular customer. The newly created object associated with node 606 could be of any specific nature but might be an email object or a product object. For the purpose of illustration, it will be assumed that the object created in accordance with node 606 is a contact object that includes an updated billing address for the same customer for whom the account object is created in accordance with node 602. Because the updated billing address has importance regardless of the account to be created in accordance with node 602 (i.e., the customer may have more accounts), the association between nodes 604 and 606 will be assumed to be freestanding.

In accordance with node 612, everything related to account object creation 602 can be deleted. When node 612 is "hoisted up," nodes 608, 604 and 602 dangle there from, and are therefore deleted. Nodes 606 and 610 are not hoisted up do to the freestanding association. Instead, the association between nodes 604 and 606 is undone. In accordance with one embodiment, nodes 606 can be independently played back. In accordance with another embodiment, however, node 606 can be re-associated with a different node, such as a node associated with a different account belonging to the same customer (or some other object related to that customer). Either way, the new billing address will be maintained.

As has been described, collapsing the playback graph involves working through the workflow lifecycle of various objects to ascertain what was done in order to determine how to undo what was done in instances where it will eliminate unnecessary items from the graph. In some cases, playback graphs involving long running transactions can be rather complex, making them a challenge to collapse. In accordance with one embodiment, multiple passes can be made through the graph in order to collapse the graph systematically by pruning out more unnecessary transactions during each pass. The benefits of associated with reducing the number of transactions to be played back are worth more than the increase in processing necessary to conduct multiple passes through the graph.

While making passes through the graph, certain points are identified as potential starting places for pruning. In accordance with one embodiment, while scanning through object transactions arranged in the graph over time, particular attention is given to delete actions. When a delete action is identified, then a determination is illustratively made as to whether the related object was created offline. If it was created offline, then the collapsing process begins with the delete action and works backwards in time pulling in all connected actions for deletion from the graph. If an associated object is encountered, or creation of an associated object, then a determination is made as to the nature of the association. If the association is dependent, then the dependent branch is deleted. If the association is freestanding, then the branch is disassociated (and can be re-associated if necessary). If the object was created online, then as much as possible can be deleted from the graph and the delete action should be noted during playback so that further deletion can be applied to server-side data if necessary.

In accordance with one embodiment, while scanning through object transactions arranged in the graph over time, particular attention is given to multiple consecutively arranged updates. When multiple consecutively arranged updates are encountered, a collapsing process can begin starting with the earliest update. Starting with the earliest update, all updated attributes for the object are stored. Then, the update next in time is examined. Stored attributes updated later in time are replaced with the latest version. Newly updated attributes are added to the store. The process is repeated for additional updates if necessary. In this manner, multiple updates can be collapsed into a single update for playback (a single comprehensive list of updated attributes). Time-stamps marking attribute and/or object creation and/or modification are illustratively utilized as a basis for making merging decisions.

In accordance with one embodiment, while scanning through object transactions arranged in the graph over time, particular attention is given to an object creation transaction that is followed by one or more update actions. In this situation, there are at least two options. First, the object creation could be maintained while the updates are separately collapsed into a single update as described above. Alternatively, however, all update actions could be collapsed into the create action (the attribute changed latest in times survives). The create action is then played back and includes the collapsed updates. Because it is possible that certain rules may apply differently to creates and updates, it may be desirable to keep the transaction types separate. In accordance with one embodiment, rules are implemented to deal with conflicts (i.e., attribute conflicts or object conflicts that arise during the collapsing process). Such rules could be simple (i.e., don't collapse if there is a conflict), basic (i.e., attribute last in time trumps), or complex and customized (i.e., value dependent).

In accordance with one embodiment, an arbitrary time can be selected as the start time for collapsing (i.e., yesterday at 2:00). In these circumstances, the selected time would illustratively be time zero on the playback graph that is subsequently collapsed. In accordance with one embodiment, during collapsing of the graph, objects existing before the arbitrary time are treated similar to objects created during an online period. In accordance with one embodiment of the present invention, playback is performed on an increasing time basis, while graph collapsing is mixed or performed on a decreasing time basis (playback should illustratively be in increasing time or business rules may be violated).

In accordance with one aspect of the present invention, a traditional serial list of offline transactions is maintained in a database (i.e., database 220) and a transaction graph as described is a layer created on top of, but independent of, the serial transaction list. The transaction graph logs business operations on the object level rather than on a relational database layer. In essence, the present invention proscribes creation of a business operations log, or a business transaction log. The underlying database transaction log is generally not utilized directly.

As has been described, following collapse of a playback graph, the remaining transactions are the basis for playback operations. In accordance with another aspect of the present invention, if the playback process fails or is interrupted, then the playback process can be repeated with a reduced investment of time and computing resources, as compared to traditional serial transaction playback. In accordance with one embodiment, the added efficiency can be invested by intentionally performing playback multiple times, thereby dropping traditional failure rates associated with serial transaction playback. Through the described playback of collapsed graphs, failure rates of read-back are dropped considerably.

In accordance with one aspect of the present invention, collapsed playback graphs can be utilized for applications other than those specifically described. For example, it has been described that playback graphs are utilized simply for playback from the client to the server such that transactions are processed through business logic located on the server-side. However, collapsed graphs can be otherwise utilized. For example, in accordance with one embodiment, a playback graph can be utilized as an information reference source when a client is requesting data from a server. For example, a request can made for a data transfer from the server to the client that includes only data (i.e., objects) that has not been changed on the client side. Which data to include and exclude can be easily derived from the playback graph.

In accordance with another aspect of the present invention, playback graphs can be utilized in a distributed database system, wherein multiple clients simultaneously have access to the same data stored on the central server (i.e., with reference to FIG. 2, multiple clients 204 on multiple devices 206 are able to access and manipulate central data acquired form database 212). In accordance with one embodiment, the server (i.e., server 208) queries as to which client 204 has more recent data, and digests a related collapsed playback graph. In accordance with another embodiment, however, multiple collapsed playback graphs could be collapsed together into a single playback graph, which would provide the basis for playback to the central server. For example, every collapsed playback graph in a network could be obtained and collapsed into a single graph that represents the most recent data demonstrated by the network as a whole. Rules are illustratively implemented to handle data conflicts that arise during the collapse of multiple graphs. Again, such rules could be simple (i.e., don't collapse if there is a conflict), basic (i.e., attribute last in time trumps), or complex and customized (i.e., value dependent).

Although the present invention has been described with reference to preferred embodiments, workers skilled in the art will recognize that changes may be made in form and detail without departing from the spirit and scope of the invention.

What is claimed is:

1. A method of synchronizing data shared between multiple applications, the method comprising:
    processing a plurality of data modification operations associated with a first application;
    constructing a playback graph that includes a record of at least some of the plurality of data modification operations, wherein the record identifies at least one modification transaction with an indication of modification type, and wherein constructing the playback graph comprises constructing an object update graph that tracks a sequence of operations that occur on an object-by-object basis and that tracks an object delete operation associated with a related object;
    deleting at least one data modification operation linked to the related object;

encountering an associated object while deleting said at least one data modification operation linked to the related object;

determining whether the associated object is a freestanding associated object or a dependent associated object; and playing back to a second application a set of data modification operations identified in the playback graph.

2. The method of claim 1, wherein the first and second applications are multiple instances of the same application.

3. The method of claim 1, wherein the first application is implemented on a client device and the second application is implemented on a server.

4. The method of claim 1, wherein the method further comprises eliminating at least one unnecessary data modification operation from the playback graph.

5. The method of claim 1, wherein playing back the set of data modification operations comprises playing back to a second application a plurality of data modification operations associated with the object update graph.

6. The method of claim 1, wherein the method further comprises eliminating at least one unnecessary data modification operation from the object update graph.

7. The method of claim 1, wherein constructing a playback graph further comprises constructing an object update graph that tracks at least one object update operation.

8. The method of claim 1, wherein constructing a playback graph further comprises constructing an object update graph that tracks multiple consecutive object update operations.

9. The method of claim 8, wherein constructing an object update graph further comprises merging a plurality of consecutive object update operations so as to enable the elimination of at least one object update operation.

10. The method of claim 9, wherein merging the plurality of consecutive object update operations comprises merging object update operations on an attribute-by-attribute basis.

11. The method of claim 1, wherein constructing a playback graph further comprises constructing an object update graph that tracks at least one object create operation.

12. The method of claim 1, wherein constructing a playback graph further comprises constructing an object update graph that tracks an object create operation that is followed by an object update operation.

13. The method of claim 12, wherein constructing an object update graph further comprises merging the object update operation with the object create operation so as to enable the elimination of the object update operation.

14. The method of claim 13, wherein merging the object update operation with the object create operation comprises merging on an attribute-by-attribute basis.

15. The method of claim 1, further comprising deleting at least one data modification operation linked to a dependent associated object.

16. The method of claim 1, further comprising re-associating a freestanding associated object.

17. The method of claim 1, further comprising identifying whether the related object was created during an on-line mode or an off-line mode.

18. The method of claim 17, wherein when the related object was created during an on-line mode, the method further comprises eliminating at least one data modification operation linked to the related object.

19. The method of claim 17, wherein when the related object was created during an off line mode, the method further comprises eliminating at least one data modification operation that occurred during the on-line mode and is linked to the related object.

20. The method of claim 19, wherein when the related object was created during an off line mode, the method further comprises making a notation that additional eliminating of data modification operations are required when the on-line mode is resumed.

21. A method of synchronizing data shared between multiple applications, the method comprising:

performing a plurality of data modification operations in association with a first application;

maintaining a transaction log that reflects the plurality of data modification operations including some data modifications listed in sequence on an object-by-object basis, wherein the transaction log tracks an object delete operation associated with a related object;

modifying the transaction log so as to create a processed transaction log, wherein modifying the transaction log comprises deleting at least one data modification operation linked to the related object;

encountering an associated object while deleting said at least one data modification operation linked to the related object;

determining whether the associated object is a freestanding associated object or a dependent associated object; and playing back to a second application a plurality of data modification operations associated with the processed transaction log.

22. The method of claim 21, wherein modifying the transaction log comprises eliminating at least one unnecessary data modification operation.

23. The method of claim 21, wherein modifying the transaction log comprises constructing a playback graph that corresponds to the transaction log.

24. The method of claim 23, wherein playing back the plurality of data modification operations comprises playing back to a second application a plurality of data modification operations associated with the playback graph.

25. The method of claim 23, wherein constructing a playback graph comprises constructing an object update graph that tracks a plurality of data modifications in association with at least one related object.

26. The method of claim 25, wherein playing back the plurality of data modification operations comprises playing back to a second application a plurality of data modification operations associated with the object update graph.

27. The method of claim 23, wherein modifying further comprises eliminating at least one unnecessary data modification operation.

28. A method of synchronizing data shared between multiple applications, the method comprising:

performing a plurality of data modification operations in association with a first application;

maintaining a transaction log that identifies at least some of the plurality of data modification operations with an indication of modification type, wherein the transaction log tracks a sequence of operations that occur on an object-by-object basis and includes an object delete operation associated with a related object;

deleting at least one data modification operation linked to the related object;

encountering an associated object while deleting said at least one data modification operation linked to the related object;

determining whether the associated object is a freestanding associated object or a dependent associated object;

creating an object information layer that is independent of the transaction log and records information from the transaction log on an object level; and playing back to a second application a plurality of data modification operations associated with the object information layer.

29. The method of claim 28 and further comprising modifying the transaction log, wherein modifying further comprises eliminating at least one unnecessary data modification operation from the transaction log.

30. The method of claim 28, wherein modifying the transaction log comprises constructing a playback graph that corresponds to the transaction log.

31. The method of claim 30, wherein playing back the plurality of data modification operations comprises playing back to a second application a plurality of data modification operations associated with the playback graph.

32. The method of claim 30, wherein constructing a playback graph comprises constructing an object update graph that tracks a plurality of data modifications in association with at least one related object.

33. The method of claim 32, wherein playing back the plurality of data modification operations comprises playing back to a second application a plurality of data modification operations associated with the object update graph.

34. The method of claim 30, wherein modifying further comprises eliminating at least one unnecessary data modification operation.

* * * * *